Sept. 25, 1928.                                                    1,685,205
                        M. F. STEIN
                  RATE OF FLOW CONTROLLER Filed Dec. 17, 1924

Witness:
R. Burkhardt.

Inventor:
Milton F. Stein,
By Cromwell, Greist & Warden
                        attys.

Patented Sept. 25, 1928.

1,685,205

UNITED STATES PATENT OFFICE.

MILTON F. STEIN, OF CHICAGO, ILLINOIS, ASSIGNOR, BY MESNE ASSIGNMENTS, TO GENERAL ZEOLITE COMPANY, OF CHICAGO, ILLINOIS, A CORPORATION OF ILLINOIS.

RATE OF FLOW CONTROLLER.

Application filed December 17, 1924. Serial No. 756,489.

My invention relates to rate of flow controllers and more specifically to rate controllers embodying a Venturi tube, the invention being particularly useful in water purification systems.

Controllers of the Venturi tube type, heretofore known, can be divided generally into two classes, one class embodying rate controllers having a single diaphragm of relatively large size directly connected to the control valve and operated directly by the differential pressure resulting from flow through the tube. This type of device has a tendency to stick at a point before a complete correction in the flow is had, due to friction in the parts, also to the low operating pressure which is brought to bear upon the diaphragm and the tendency of the operating pressure to approach zero as the controller approaches final adjustment.

The second class comprises controllers having a small diaphragm operated by the differential pressure resulting from flow through the tube and directing the movement of a pilot valve, this pilot valve controlling fluid under pressure from a source external to the tube. From the pilot valve the fluid under pressure is transferred to a hydraulic piston which operates a control valve. Apparatus of this kind has the disadvantage that it hunts, causing the flow through the tube to surge. This is due to the retarded action of the control apparatus in relation to change in the rate of flow which prohibits the establishment of a state of equilibrium, the flow not being cut off until it rises above the desired rate and then closing to a point below the desired rate in order to secure a desired mean flow.

The primary object of this invention is the provision of a rate controller adapted to reduce to a constant rate of flow liquid subjected to varying heads.

A further object of the invention is the provision of a rate controller which is sensitive and responsive to slight changes in head and which does not stick or set.

Another object of the invention is the provision of a rate controller wherein hunting, and surging of the flow is eliminated.

A still further object of the invention is the provision of a rate controller which utilizes the difference in pressure at various points in the structure under different rates of flow for affecting a sensitive member and also as a source of power. The said sensitive member reacting immediately to change in the flow and controlling the application of the power upon a second member which directly regulates the flow.

A more particular object of the invention is to provide improvements in rate controllers of the Venturi tube type whereby friction of the fluid within the tube is decreased and countercurrents are avoided thereby permitting the shortening of the recovery portion of the Venturi tube.

Other objects and advantages in my invention will be obvious to those skilled in the art upon perusal of the accompanying drawing and the following description based thereon, wherein.

Figure 1:
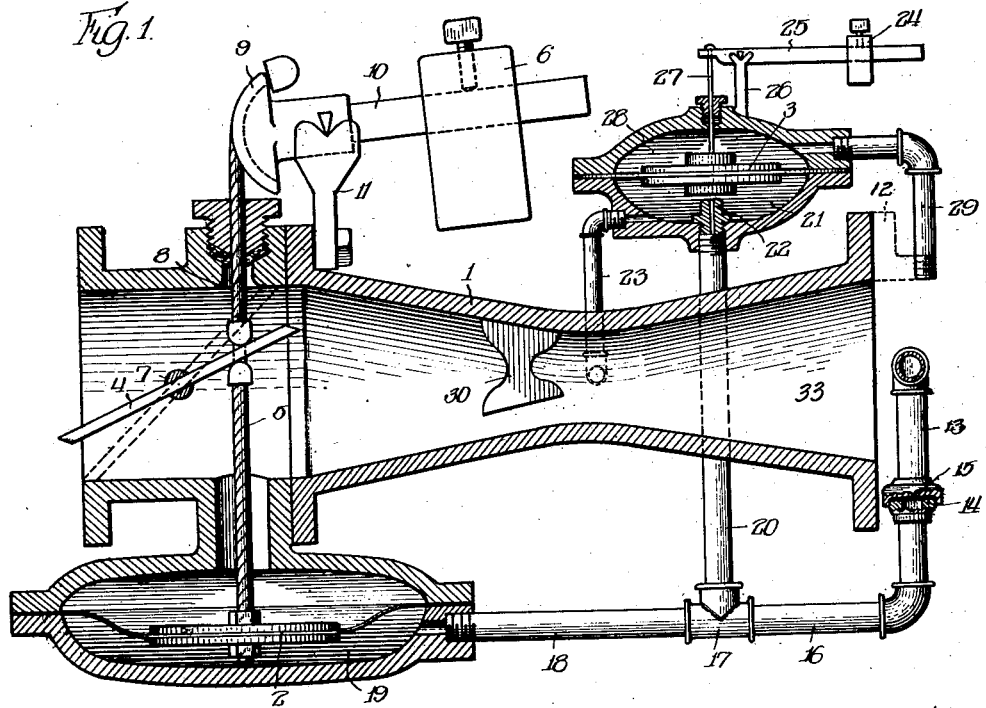
Fig. 1 is a vertical longitudinal sectional view of the device.

Having reference to the drawings in detail, the Venturi tube is numbered 1. In association with the Venturi tube are two controlling diaphragms, a primary diaphragm 2 and a secondary diaphragm 3. A butterfly valve 4, mounted in horizontal bearing members 7, is operated by the primary diaphragm 2, through suitable connecting means, to vary the effective size of the opening at the discharge end of the Venturi tube. The inner blade of the valve 4 is connected to the primary diaphragm 2 by a cable 5 and to the counterweight 6 by a cable 8. The cable 8 is retained in a segmental groove 9 provided on the end of the counterweight beam 10, the said beam being pivotally connected to the standard 11.

In communication with the inlet 12 of the Venturi tube is a pipe 13 having a transverse plate 14 centrally bored to provide an orifice 15 which permits a limited flow of the liquid from the intake into the pipe 16. The pipe 16 is connected by the T 17 to a horizontal extension 18 leading to the outer chamber 19 of the primary diaphragm and to a vertical conduit 20 leading to the inner chamber 21 of the secondary diaphragm. The upper end of the conduit 20 extends into the chamber 21 and is there provided with an orifice 22. This orifice is somewhat larger than the restricting orifice 15.

The inner chamber 21 is connected with the throat of the Venturi tube by means of the conduit 23. The diaphragm 3 is controlled by an adjustable counterweight 24 which is slidably mounted on the graduated beam 25. The said graduated beam is pivotally mounted on the standard 26 and operatively associated with the diaphragm 3 by the rod 27. The outer chamber 28 of the secondary diaphragm is in communication with the inlet 12 through the pipe 29.

Obviously, the pipes 13 and 29 may be connected directly to the portion 33 of the Venturi tube, thereby making the structure a complete unit. The word "intake" as used in the claims refers to either the portion 33 or the supply pipe 12, one connection being the equivalent of the other, since the pressure and rate of flow are the same in each.

A helically shaped diffuser 30, provided just beyond the throat of the tube in the recovery portion thereof, imparts to the liquid a rotary motion causing it to completely fill the recovery end of the tube. Countercurrents are thus avoided and with these eliminated the recovery end of the tube may be materially shortened.

Figure 2:
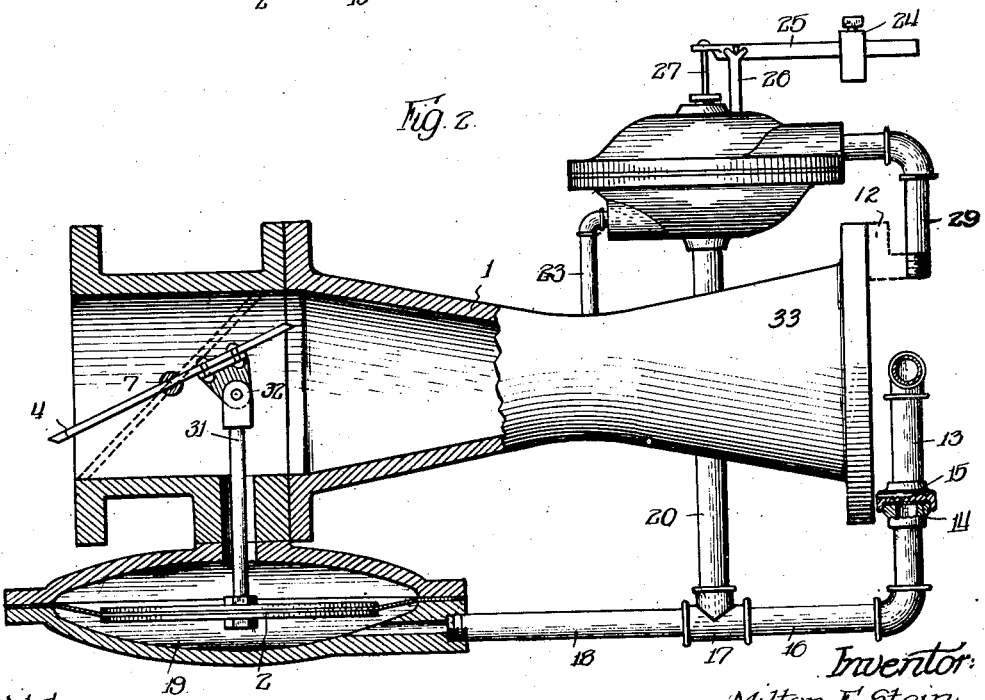
Fig. 2 is a front elevation partially broken away to show a modified form of the control valve operating mechanism.

In the modified structure shown in Fig. 2 the cables 5 and 8, counterweight 6 and associated mechanism for the operation of the outlet control valve 4 are omitted. In substitution therefor the primary diaphragm 2 directly operates the outlet control valve 4 through the rod 31 which is rigidly secured to the diaphragm and is pivotally connected at 32 to the control valve.

In operation, the butterfly valve 4 directly controls the exhaust flow from the Venturi tube. If the flow through the tube increases, the pressure in the restricted area or at the throat of the tube is decreased relative to the pressure in the approach 12 and as a result the pressure in the inner diaphragm chamber 21 which is connected to the throat of the tube 1 by the pipe 23 is decreased relative to the pressure in the outer diaphragm chamber 28, the latter chamber being in communication with the approach 12 through the conduit 29. With this relative decrease in pressure in the chamber 21 as to that in the chamber 28, the secondary diaphragm 3 is forced down, tending to close the orifice 22. With the closing of the orifice 22, the flow through pipe 20 is transferred to pipe 18 and pressure is built up in chamber 19 of the primary diaphragm. This pressure forces the primary diaphragm 2 upward and through the action of the counterweight 6 and the intermediate cable 8 the butterfly valve 4 is moved toward its closed position. In the operation of the structure disclosed in Fig. 2 the differential pressure on the primary diaphragm will push the control valve 4 toward its closed position through means of the connecting rod 31 and the pivotal joint 32.

As the butterfly valve restricts the outlet portion of the Venturi tube the amount of liquid escaping is cut down and as a result of the decreasing flow the pressure in the throat of the tube rises relative to that in the approach 12 and these pressures are immediately transmitted to chambers 21 and 28, with the result that the differential pressure on the secondary diaphragm is reduced and weight 24 pulls the diaphragm 3 up, thereby opening orifice 22 until a condition of equilibrium throughout the apparatus is established. This condition results when the flow through orifice 15 equals that through orifice 22, after which there will be no flow through pipe 18 into chamber 19 of the primary diaphragm and consequently the motion of valve 4 will cease.

It is apparent that the reverse of this action will occur if there should be a decrease of flow through the tube. The actual flow existing at the time equilibrium is established will depend upon the effect of the weight 24 in opposing the differential pressure upon diaphragm 3. The controller can be set to maintain any desired rate of flow by moving the weight 24 along the graduated beam 25 and any change from this rate due to a change of pressure in the system or other cause will be automatically corrected in the manner above described.

The primary diaphragm in the present apparatus is always brought into immediate operation, upon change in the rate of flow, by positive forces of considerable magnitude which are enough to overcome friction in the outlet control valve parts and the operating means associated therewith. Sticking of the apparatus before final adjustment is made is thereby prevented and a constant rate of flow without hunting or surging is assured.

I claim:

1. A rate of flow controller comprising a tube having a constricted area therein, means for regulating the flow through said tube, a diaphragm operatively associated with said means and having both chambers thereof in communication with said tube at the high pressure portions thereof, and hydraulically operated means for modifying the pressure on one side of said diaphragm incident to change in the rate of flow.

2. A rate of flow controller comprising a tube having a constricted area therein, means for regulating the flow through said tube, a diaphragm operatively associated with said means and having both chambers thereof in communication with said tube at the high pressure portions thereof, hydraulically operated means for modifying the pressure of one side of said diaphragm incident to change in the rate of flow, and means for returning fluid from said diaphragm to the constricted portion of said tube.

3. A rate of flow controller comprising a tube having a constricted area therein, a valve for regulating the flow through the tube, a primary diaphragm in operative association with said valve and having one chamber thereof in communication with the tube, means connecting the other chamber of said diaphragm with a source of fluid under pressure, a secondary diaphragm, means for operating said secondary diaphragm incident to changes in the rate of flow and means operable by said secondary diaphragm for controlling the pressure in the second chamber of the primary diaphragm.

4. In a rate of flow controller the combination with a tube having a constricted area therein of a control valve, a primary diaphragm in operative association with the control valve and having one chamber in direct communication with the tube, a secondary diaphragm, means for affording communication between one chamber of the secondary diaphragm and the intake of the tube means for affording communication between the second chamber of the secondary diaphragm and a constricted area in the tube, means associated with the secondary diaphragm for regulating the pressure in the second chamber of the first mentioned diaphragm.

5. In a rate of flow controller the combination with a Venturi tube of a control valve, a primary diaphragm in operative association with the control valve, means for affording communication between the recovery tube and one chamber of the primary diaphragm, a pipe connecting the second chamber of the diaphragm with the intake, means for restricting the flow through said pipe and means for controlling the pressure on the diaphragm proportionately as to the rate of flow through the tube.

6. In a rate of flow controller the combination with a Venturi tube of a control valve, a primary diaphragm operatively associated with the control valve one chamber of said diaphragm being in communication with the recovery tube, a conduit communicating with the second chamber of the diaphragm and the intake, means for restricting the flow through said conduit, means for releasing the pressure in the second chamber of the diaphragm, and means for operating said pressure releasing means incident to change in the rate of flow.

7. A rate of flow controller comprising a tube having a constricted area therein, a valve for controlling the flow through said tube, a primary diaphragm in operative association with said valve, one chamber of said diaphragm being directly in communication with the tube, the second chamber of said diaphragm being in communication with the intake, means for restricting the flow into said second chamber from the intake, a secondary diaphragm, one chamber of said secondary diaphragm being in communication with an end portion of said tube, the second chamber of said diaphragm being in communication with the constricted area of said tube, a valve operated by said diaphragm, said valve being operably associated with the primary diaphragm to control the pressure on the same.

8. A rate of flow controller comprising a tube having a constricted area therein, a valve for regulating the flow through the tube, a counterweight associated with said valve to aid in actuating the same, a primary diaphragm in operative association with said valve and having one chamber thereof in communication with the tube, means connecting the other chamber of said diaphragm with a source of fluid under pressure, a secondary diaphragm, means for operating said secondary diaphragm incident to change in the rate of flow, and means operable by said secondary diaphragm for controlling the pressure in the second chamber of the primary diaphragm.

9. A rate of flow controller comprising a tube having a constricted area therein, a valve for regulating the flow through the tube, a primary diaphragm, a cable connecting said diaphragm with said valve, and a second cable connecting said diaphragm with a counterweight, one of the chambers of said diaphragm being in communication with the tube, means connecting the other chamber of said diaphragm with a source of fluid under pressure, a secondary diaphragm, means for operating said secondary diaphragm incident to changes in the rate of flow and means operable by said secondary diaphragm for controlling the pressure in the second chamber in the primary diaphragm.

10. In a rate of flow controller the combination with a Venturi tube, of means for controlling the rate of flow through said tube, and means for imparting a rotary motion to the said flow.

11. In a rate of flow controller the combination with a Venturi tube, of means for controlling the flow through said tube, and a diffusion member adapted to impart a rotary motion to the flow.

12. In a rate of flow controller the combination with a Venturi tube, of means for controlling the rate of flow through the said tube, and a helically shaped diffusing member positioned in the proximity of the throat of said tube.

In testimony whereof I have hereunto subscribed my name.

MILTON F. STEIN.